(12) United States Patent  (10) Patent No.: US 8,934,627 B2
Carlson  (45) Date of Patent: Jan. 13, 2015

(54) VIDEO EVENT CAPTURE, STORAGE AND PROCESSING METHOD AND APPARATUS

(75) Inventor: Randolph S. Carlson, Carson City, NV (US)

(73) Assignee: Aprolase Development Co., LLC, Wilmington, DE (US)

( * ) Notice: Subject to any disclaimer, the term of this patent is extended or adjusted under 35 U.S.C. 154(b) by 2998 days.

(21) Appl. No.: 10/178,390

(22) Filed: Jun. 24, 2002

(65) Prior Publication Data

US 2003/0009773 A1  Jan. 9, 2003

Related U.S. Application Data

(60) Provisional application No. 60/300,449, filed on Jun. 25, 2001.

(51) Int. Cl.
*G06F 21/00* (2013.01)
*G06F 21/62* (2013.01)

(52) U.S. Cl.
CPC ...................................... *G06F 21/62* (2013.01)
USPC ........................... 380/200; 380/201; 713/189

(58) Field of Classification Search
None
See application file for complete search history.

(56) References Cited

U.S. PATENT DOCUMENTS

| | | |
|---|---|---|
| 4,587,621 A | 5/1986 | DuVall |
| 4,675,532 A | 6/1987 | Carson |
| 4,720,745 A | 1/1988 | DeFortest et al. |
| 4,729,025 A | 3/1988 | Yanase |
| 4,750,211 A | 6/1988 | Wray |
| 4,816,913 A | 3/1989 | Harney et al. |
| 5,025,394 A | 6/1991 | Parke |
| 5,125,042 A | 6/1992 | Kerr et al. |
| 5,212,546 A | 5/1993 | Arazi et al. |
| 5,259,040 A | 11/1993 | Hanna |
| 5,404,316 A | 4/1995 | Klingler et al. |
| 5,448,053 A | 9/1995 | Rhoads |
| 5,537,530 A | 7/1996 | Edgar et al. |
| 5,566,251 A | 10/1996 | Hanna et al. |
| 5,572,608 A | 11/1996 | Edgar |
| 5,604,601 A | 2/1997 | Edgar et al. |
| 5,608,538 A | 3/1997 | Edgar et al. |
| 5,627,765 A | 5/1997 | Robotham et al. |
| 5,644,513 A | 7/1997 | Rudin et al. |

(Continued)

OTHER PUBLICATIONS

Schneier, Applied Cryptography, 1996, John Wiley & Sons, Inc., Second Edition, pp. 518-519.*

(Continued)

*Primary Examiner* — Benjamin Lanier

(57) ABSTRACT

Generating a still image from a sequence of video frames comprises the steps of receiving a sequence of video frames and storing a predetermined number of the sequence of video frames temporally adjacent to an user initiated capture event, the predetermined number of frames being defined as a cliplet. Video capture is performed using cliplets, which are short video segments, preferably in compressed data format. A crop-and-process instruction is added to the cliplet. All processing, handling or storage of the data is cliplet based. Editing instructions are stored with the cliplet allowing editing to be performed by a user at one resolution and then re-performed at a higher resolution at a server where it is printed. Modified reprints of an image can be obtained without resending the images and adequate storage for the cliplets can be assured. Encryption of the cliplets during transmission and storage is facilitated by cliplet-based processing.

53 Claims, 2 Drawing Sheets

(56) References Cited

U.S. PATENT DOCUMENTS

| | | |
|---|---|---|
| 5,649,032 A | 7/1997 | Burt et al. |
| 5,657,402 A | 8/1997 | Bender et al. |
| 5,666,215 A | 9/1997 | Fredlund et al. |
| 5,767,987 A | 6/1998 | Wolff et al. |
| 5,771,317 A | 6/1998 | Edgar |
| 5,793,379 A | 8/1998 | Lapidous |
| 5,809,174 A | 9/1998 | Purcell et al. |
| 5,835,160 A | 11/1998 | Chen et al. |
| 5,859,668 A | 1/1999 | Aono et al. |
| 5,861,924 A | 1/1999 | Pan et al. |
| 5,920,657 A | 7/1999 | Bender et al. |
| 5,930,445 A | 7/1999 | Peters et al. |
| 6,009,213 A | 12/1999 | Miyake |
| 6,017,157 A | 1/2000 | Garfinkle et al. |
| 6,023,343 A * | 2/2000 | Hoang et al. ............... 358/1.16 |
| 6,075,905 A | 6/2000 | Herman et al. |
| 6,121,966 A | 9/2000 | Teodosio et al. |
| 6,133,985 A | 10/2000 | Garfinkle et al. |
| 6,204,840 B1 | 3/2001 | Petelycky et al. |
| 6,226,015 B1 | 5/2001 | Danneels et al. |
| 6,263,268 B1 * | 7/2001 | Nathanson ...................... 701/29 |
| 6,285,804 B1 | 9/2001 | Crinon et al. |
| 6,650,704 B1 | 11/2003 | Carlson et al. |
| 6,964,025 B2 * | 11/2005 | Angiulo et al. ............... 715/838 |
| 7,197,228 B1 * | 3/2007 | Monroe et al. ................. 386/46 |
| 2002/0118949 A1 * | 8/2002 | Jones et al. ..................... 386/68 |

OTHER PUBLICATIONS

International Search Report for PCT/US2002/19779, mailed Feb. 27, 2003.

International Search Report for PCT/US00/29448 mailed Feb. 26, 2001.

* cited by examiner

VIDEO EVENT CAPTURE, STORAGE AND PROCESSING METHOD AND APPARATUS

RELATED APPLICATIONS

The application is related to U.S. Provisional Patent Application Ser. No. 60/300,449, filed Jun. 25, 2001, to which the present application claims priority under 35 USC 119 and which is incorporated herein by reference.

BACKGROUND OF THE INVENTION

1. Field of the Invention

The invention relates to a methodology and apparatus adapted to capture still images from video sources in real time for the composition of those images.

2. Description of the Prior Art

There exists a need and desire among a wide range of individuals and organizations to capture important, interesting and/or meaningful events for future appreciation, viewing and/or other use. Particularly, there is a longstanding desire among industry and consumers to obtain still images in the form of silver halide photographs or similar hard-copy images of events of various kinds. It will be appreciated by those familiar with the photographic art, that there is considerable difficulty involved in capturing a precisely defining photograph of an event occurring at a single instant in time. The difficulty herein lies both in the photographic composition of the subject matter and in the selection of the precise instant at which to take the picture.

RedHawk Vision Inc. has developed software that generates high quality images from video source material as set forth in U.S. Pat. No. 4,675,532 and copending U.S. patent applications Ser. Nos. 09/697,017 and 09/427,384, which are incorporated herein by reference. This RedHawk software allows a user to select a precise moment captured in video source material, zoom, pan and spatially clip the scene dimensions to a desired format size and then generate a high resolution image by combining information from the selected video frame with information from temporally nearby video frames. The RedHawk software user can 1) choose the precise moment in time; 2) spatially frame the subject matter; and 3) determine the length of time (i.e. number of video frames) over which the "moment" is to be "taken". Experience with the RedHawk software has shown that particularly compelling pictures that portray individual moments can be obtained from video of the subject activity much more reliably and easily than can similar images made by still photography during the event. We have also found that multiple, different images, derived from a small time segment of a video (e.g. a second or less) may each be particularly compelling. Further, several images of different subjects taken at the same "moment" are also sometimes useful. The result is that the RedHawk software often is used to extract multiple, different images from a single "moment", all of which images are useful.

Notwithstanding the considerable usefulness and desirable and advantageous characteristics of the current RedHawk software, there remain several limitations and disadvantages associated with its use and with the use of frame-grabbers and similar technologies, techniques, methods and products available from others for extracting still images from video. Among the problems and disadvantages of current still extraction technologies is the effort required to locate the point within the video source from which the image is to be extracted.

On the one hand, simple frame-grabbers such as the Snappy Hardware Frame Grabber allow the user to trigger the "grab" of a video frame in real time, without the need to re-watch the event on tape to find the "moment" of interest. This offers a significant "work flow" advantage, however the technique presents all of the timing difficulties of real-time, still photography. As a practical matter, the user may end up watching an event multiple times by replaying the video or parts thereof, and making multiple attempts to precisely "time" capture of the moment of interest, obviating the workflow advantage of capturing the event in real-time.

Alternatively, computer based video editing systems and software such as Adobe® Premiere® and specialized stills-from-video systems such as Salient Stills Video Focus™ system require that the video of interest be recorded or input in its entirety before the moment to be extracted as a still image is extracted. Not withstanding that such systems offer precise control of the moment to be extracted as a still image, they all require that the entirety of the video of interest be captured and/or input into the system prior to making the still image, thus substantially increasing the work flow time and effort over systems that allow capture of an image in real time. It is noteworthy that some implementations of the RedHawk software, including those which operate as "plug-in" accessory software to Adobe Premiere exhibit this disadvantage.

A further limitation of present systems that capture still images from video sources is the considerable difficulty that ensues when a user having an extracted still image, either in hard copy form, as for instance in the form of a silver halide print, or in the form of a digital still image file such as a JPEG file; wishes to obtain a slightly different image of the same moment. Current systems for extracting still images from video do not "tag" image files with information identifying the source video file or the location therein from which the still image was obtained. While still image editing software such as Adobe® Photo Shop® allows the addition of metadata to some still image file formats that permit such metadata to be included, manually, this may still not allow easy location of the video source material and the location within it to allow creation of related still images.

Video files are naturally large. For instance, an hour of uncompressed video having 640×480 pixel resolution, 24-bit color resolution and 30 frame per second rate requires more than 71 billion bytes of storage. The large size of video files makes their storage "on-line" problematic in many cases and makes it difficult if not impossible to return to the precise moment in a particular video file or tape from which an image was taken to obtain a similar, or related image of the moment of interest. This is particularly a problem if a long time has elapsed between the generation of the initial still image and the need or desire for the subsequent image as the video file may no longer be available on the computer or, in the case of hardware frame grabbers, the original tape may have been lost or discarded.

Thus, it is an object of the invention to permit the capture of still images from video sources in real time with greatly increased precision in the timing and control of the composition of the images.

It is also an object of the present invention to facilitate the creation of related images of a captured moment at a later time.

It is a further objective of the invention to minimize the storage and transmission bandwidth required when obtaining still images from video sources and obtaining hard copy images there from.

A yet further object of the invention is to insure availability of adequate storage capacity on a users system prior to capturing images to prevent failure to capture an image at a critical moment owing to a lack of available storage.

An additional object of the invention is to inhibit the viewing and/or use of captured image information by unauthorized persons.

These and other objects of the invention can now be understood by turning to the following brief summary.

BRIEF SUMMARY OF THE INVENTION

The invention is an improvement in a method generating a still image from a sequence of video frames comprising the steps of receiving a sequence of video frames; storing a temporal sequence of video frames; and copying a predetermined number of frames temporally proximate to a capture event to a data structure. The predetermined number of frames temporally proximate to the capture event being defined as a cliplet.

The step of storing a predetermined number of the sequence of video frames comprises storing a cliplet of at least one tenth of a second of display time at normal frame rates.

The step of storing a predetermined number of the sequence of video frames comprises storing an instruction associated with the cliplet relating to a selected frame within the cliplet.

The step of storing an instruction associated with the cliplet comprises storing data relating to a selected portion of the selected frame within the cliplet, such as storing setting information, like crop dimensions, a crop location, an up-sample ratio, a sharpness parameter, a persistence parameter, and the number of frames to be processed to form a still image, or at least one of such parameters.

The step of storing a predetermined number of the sequence of video frames comprises storing the cliplet in the compressed data format.

The improvement in the method further comprises the step of processing all captured events in the form of cliplets, namely transporting, storing, archiving and retrieving video frames or at least one of such processes.

The step of storing an instruction associated with the cliplet stores a default instruction and at least one revised instruction relating to the selected frame.

The improvement of the method further comprises the steps of processing the cliplet at a first resolution according to processing instructions determined at the first computer, communicating the cliplet and processing instructions together from a first to a second computer, processing the cliplet at a second higher resolution according to the processing instructions determined at the first computer to generate a first still image.

The improvement of the method further comprises the steps of communicating a second set of processing instructions between the first and second computer and a reference to the corresponding cliplet to the second computer and generating a second still image.

The improvement of the method further comprises the steps of generating a blank cliplet to reserve data space in a buffer. The improvement further comprises the step of uniquely identifying the blank cliplet to the client computer and recognizing in a server computer the cliplet as uniquely identified with the client computer when the cliplet is accessed by the server computer.

The improvement of the method further comprises the steps of encrypting the cliplet and communicating it to the server computer in encrypted form, such as by storing pseudorandom data in the blank cliplet, and later overwriting the blank cliplet by input captured data with the pseudorandom data so that encryption is realized without slowing capture of the cliplet.

The improvement of the method further comprises the step of exchanging an encryption key between the client and server computers at the time the blank cliplet is stored into the buffer thereby avoiding exchange of the encryption key after the blank cliplet is overwritten and later uploaded into the server computer. The step of exchanging the encryption key between the client and server computers occurs during a different communication session from when the server computer uploads the encrypted cliplet from the client computer.

The invention is also defined as a method for representing an event, object or video data as a still image comprising the steps of providing a temporally proximate sequence of video images, defined as a cliplet. The method continues with the steps of selecting one of the temporally proximate sequence of video images as a captured image; and providing at least one instruction associated with the cliplet to form a combined data structure. The data structure, which is the quantum of information handled by further evolutions of the cliplet, can be tangibly recorded in a memory circuit, a hard disk, a floppy disk, a compact disk or any other storage medium now known or later devised. The instruction defines or serves to implement in a computer or data processing circuit temporal processing of at least one video image of the cliplet using temporally displaced images or data in addition to the captured image to render an enhanced still image corresponding to the captured image.

The step of providing at least one instruction associated with the cliplet provides an instruction which also includes spatial processing of at least one video image of the cliplet to render a still image corresponding to the captured image.

The method further comprises the steps of storing, archiving, transporting, processing, or communicating the combined data structure of the cliplet and its associated instruction or instructions as a single unit of information in a computer system.

The invention further comprises a video viewer, such as a computer and computer network controlled by software for performing the foregoing improvements in the described methodology for generating a still image from a sequence of video frames.

Specifically, the illustrated embodiment of the invention is an improvement to a video viewer for use in combination with a display device comprising a computer for receiving a sequence of video frames. The display device may be a computer monitor, a television set or monitor, an LCD screen, or simply an optical site or screen on a camera. A buffer stores a temporal sequence of video frames corresponding to what is seen in the display device. The computer copies a predetermined number of frames which are temporally proximate to a capture event from the buffer to a data structure. A "data structure" is information which is stored and which has a predetermined internal logical structure, which can later be used to interpret, process and exploit the information. Thus, "data structure" is also used to refer to a device in which such information is stored. The predetermined number of frames are temporally proximate to the capture event and are defined as a cliplet.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Generating a still image from a sequence of video frames comprises the steps of receiving a sequence of video frames and storing a predetermined number of the sequence of video frames temporally adjacent to an user initiated capture event, the predetermined number of frames being defined as a cliplet. Video capture is performed using cliplets, which are short video segments, preferably in compressed data format. A crop-and-process instruction is added to the cliplet. All processing, handling or storage of the data is cliplet based. Editing instructions are stored with the cliplet allowing editing to be performed by a user at one resolution and then re-performed at a higher resolution at a server where it is printed. Modified reprints of an image can be obtained without resending the images and adequate storage for the cliplets can be assured. Encryption of the cliplets during transmission and storage is facilitated by cliplet-based processing.

Snap-and-Go

Figure 1:
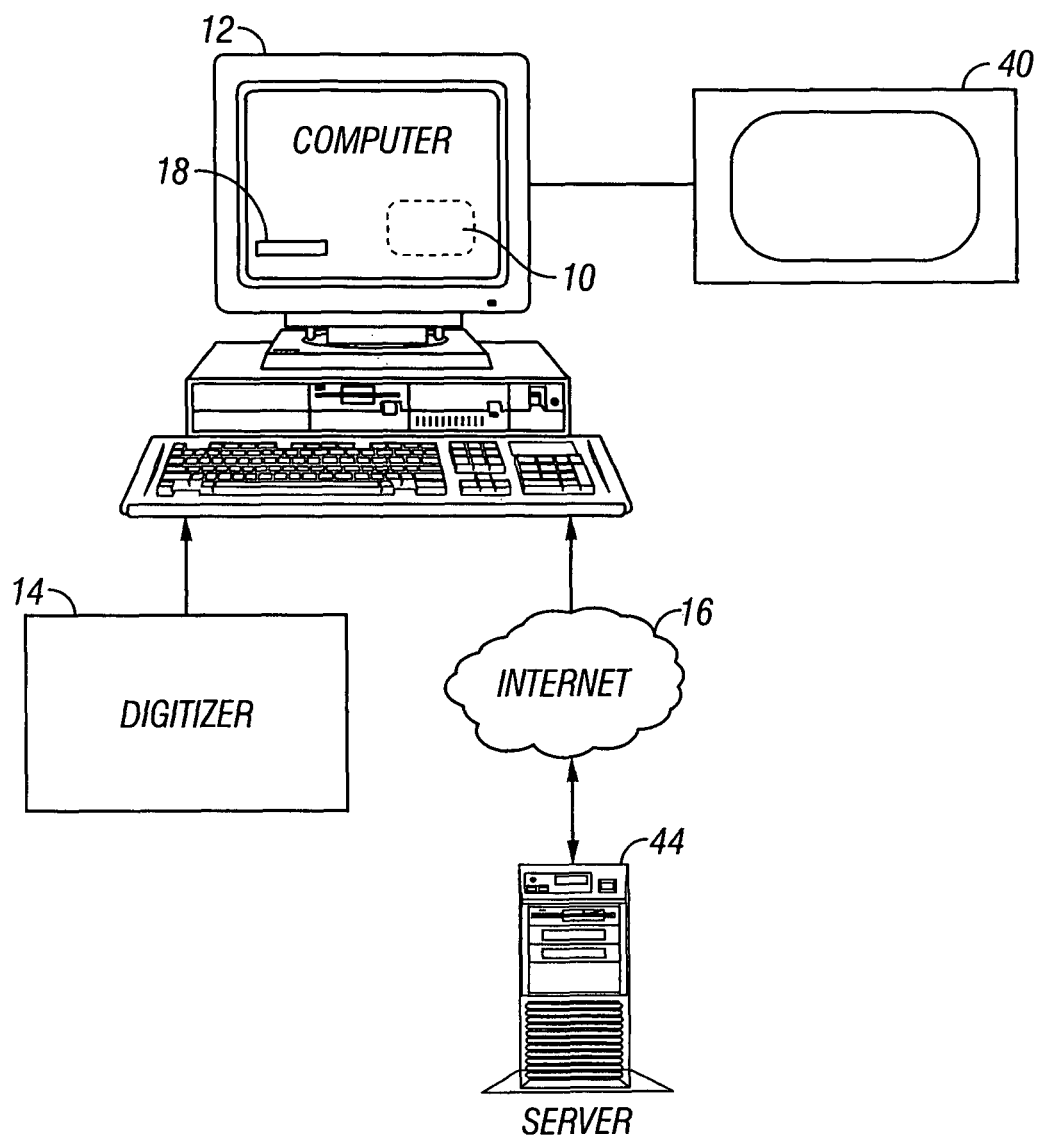
FIG. 1 is a simplified block diagram of a user computer and network with a server in which the viewer of the invention is employed.

A first aspect of the invention is referred to as "Snap-and-Go". As shown in FIG. 1 this aspect of the invention comprises a video-viewer 10, implemented preferably in software and operated on a computer 12 to display video from a file 18 within computer 12, from a digitizer source 14 connected to the computer 12, or from a video file streamed over an internet connection 16 to computer 12 or fed to computer 12 by some other means.

Figure 2:
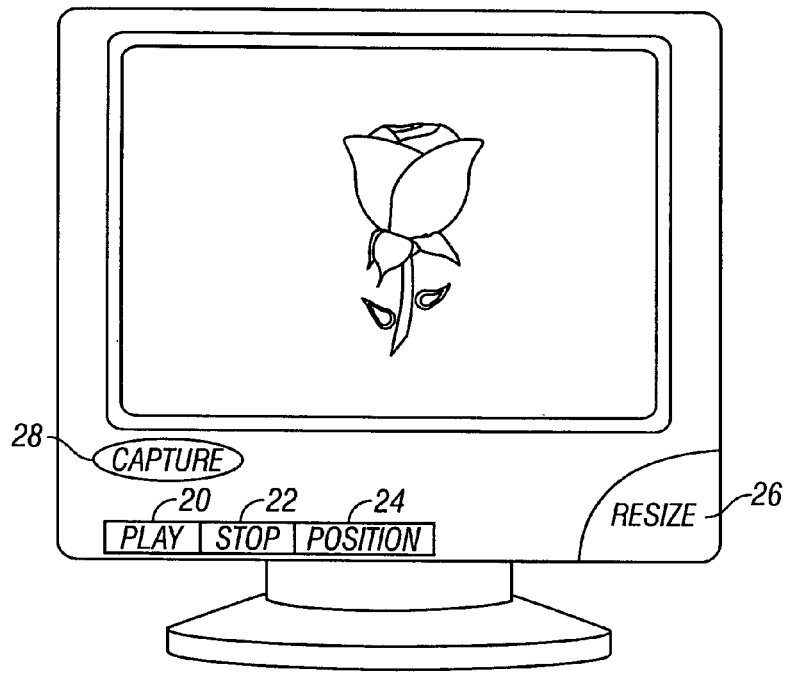
FIG. 2 is a depiction of a screen illustrating the interface of the viewer.
Figure 3:
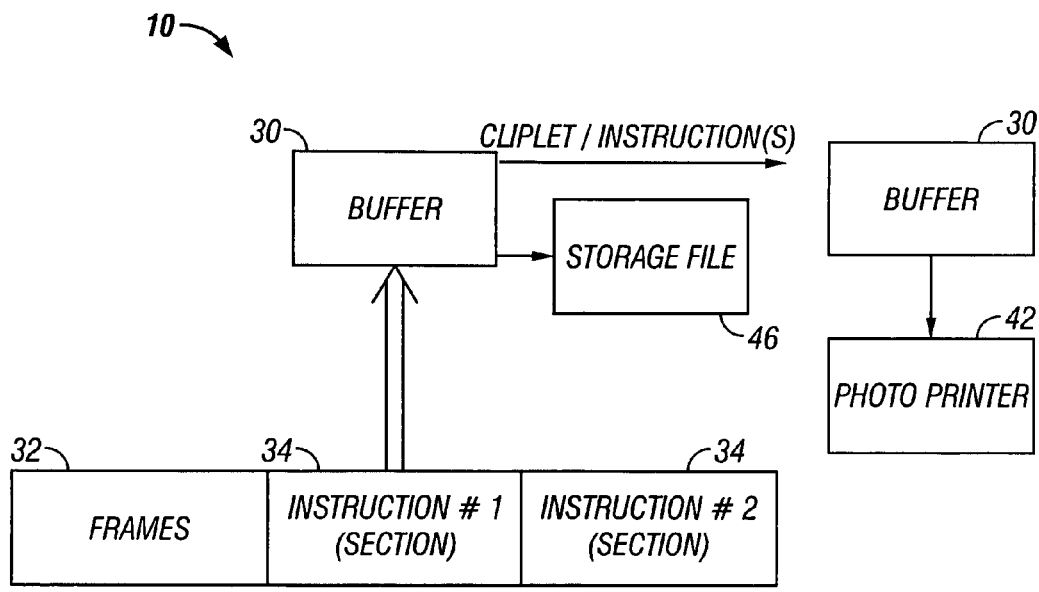
FIG. 3 is a simplified block diagram of the viewer of the invention.

Viewer 10 is similar to the Apple Quicktime® video player to the extent that, as shown in the screen depiction of FIG. 2, it provides buttons for the features of window resizability 26, play 20, stop 22, and positioning 24 (if playing from a file or such) and in addition, includes a "capture" button 28 (or similar functionality such as a "hot-key" or infrared link triggering means). Activation of the "capture" button 28 causes a short segment of the video about the time of the "capture" activation to be saved. Preferably, the section of video saved both precedes and follows the instant of "capture" activation by a second or so. Viewer 10 of this invention as shown in FIG. 3 advantageously includes a buffer 30 that stores a second or so of the video most recently displayed so that it can be saved upon activation of the "capture" button 28. Adding "Crop-and-Process-Instruction" to Cliplet When a short video segment 32 (referred to as a "cliplet") is saved upon "capture" by activation of button 28, it is saved together with a short instruction 34 or data identifying a particular frame within the cliplet 32 and describing a section within the frame from which a still image is to be extracted. Data 34 is alternatively termed a "crop-and-process-instruction". Most preferably, this "crop-and-process-instruction" 34 includes the frame number within the cliplet 32 for the desired picture and also setting information such as crop dimensions, crop location, up-sample ratio, sharpness parameter, persistence parameter, number of frames, etc. needed by the RedHawk software stored in computer 12 to extract a high resolution image from the video cliplet 32. Such RedHawk software is called Paparazzi Pics™. An example of an instruction is shown in Table I.

TABLE I

| Instruction Field | Parameter Value |
| --- | --- |
| Frame No. | 17 |
| Framing | (7, 20) (502, 350) |
| Number of frames | 4.5 |
| Sharpness | 8 |
| Persistence | 4 |
| Print Size | 5 × 7 |

In this illustration the capture event has designated frame #17, for example, from a temporal sequence of video frames as the desired image from which a still is to be derived. The framing of the image designates the pixel location of the top left and the bottom right corner of the frame. In this way a portrait or landscape format for the still image can be specified. The number of frames in the cliplet 32 can be specified. Since video images are comprised of interleaved scans of even and odd lines, it is possible to specify half frames, which is advantageous when blur of a moving image needs to be removed or clarified in the still. Sharpness refers to a parameter used in the algorithm by which still is composed of the multiple frames, which the user can select and view by trial and error until the desire effect is achieved. Persistence refers to a weighting given to frames temporally proximate to the captured frame. For example, "persistence" may a number from 1 to 10 which provides equal weight to all frames for a value of 10, decreasing with a range of stepped weights given to temporally proximate frames for values of 9 to 2, down to no weight to any frame other than the capture frame for a value of 1. Print size designates what size of print the user desires, e.g. 4×6, 5×7, 8×10 and the like. It is to be understood that the instruction 34 may have many different formats and include more or less information than in the example and may include other types information relating to processing or disposition of the still to be derived from cliplet 32.

Upon "capture" activation by button 28, the "crop-and-process-instruction" 34 is set to nominal or default values. For instance, the frame number may be selected as that frame displayed at the instant of "capture" activation by button 28; the crop region and other parameters set to the default values of the current RedHawk software, Paparazzi Pics™. It will be understood by those familiar with the art that the "crop-and-process-instruction" 34 may also or alternatively contain information to direct image extraction processes of other software routines, rather than specifically the RedHawk software. For instance, the "crop-and-process-instruction" might contain information needed to perform a single frame grab, or to direct another multi-frame image extraction program such as VIDEO FOCUS® manufactured by Salient Stills Company of Boston, Mass. or any other photo processing software now known or later devised.

Still further, more than one instruction 34 can be associated with cliplet 32. For example, a first instruction 34 might provide instructions for a 8×10 overall shot of the subject, while a second instruction 34 associated with cliplet 32 may provide instructions to crop the photo, enlarge and enhance one section of the overall shot, such as a close of one person in a group photo. A single cliplet 32 will thus be processed with multiple instructions as a unit to produce a multiple of corresponding individualized stills.

Cliplet comprising Compressed Video

Another aspect of the invention is the storage of video frames of each cliplet in compressed format. It is widely appreciated that a sequence of video frames often comprises a sequence of closely related images. Several image compression schemes are currently in use that take advantage of this fact to achieve high degrees of data compression for video files. In fact, video files from many digital video cameras are, in fact, compressed video files, as frequently are video files streamed over the Internet and files processed by many video digitizer boards that process analog video into digital files for display and manipulation by computers. Viewer 10 typically deals with compressed video files. Particularly, the viewer software retrieves video frames in compressed form (for instance by using a Quicktime call), then directs the compressed frame data to a decompression routine that is part of the computer's operating system and associated support software such as Microsoft MEDIA PLAYER® manufactured by Microsoft Inc. of Bellevue, Wash. or QUICKTIME® manufactured by Apple Computer Inc. of Cupertino, Calif. By causing the viewer to store the cliplet in the form of compressed video, that is by maintaining the previously described video buffer 30 in compressed frame format as delivered from the source and storing that as the cliplet video sequence, the size of each cliplet file is greatly reduced. It is possible, in the case of uncompressed video source material, for viewer 10 to compress the video frames in its video buffer 32 by any of several available compression algorithms like INDEO® manufactured by Intel Corp. of Santa Clara, Calif., SORENSON® manufactured by Sorenson Media of Salt Lake City, Utah, or by any other compression algorithm now known or later devised. In this way, the size of cliplets obtained even from uncompressed video files can be greatly reduced.

Cliplet+process Instruction Smaller than RedHawk High Resolution File—Without Resolution Loss A further aspect of the invention is the transport, storage, archiving and retrieval of information as cliplets, including the related crop-and-process-instruction 34, rather than as high resolution still image files in TIFF or JPEG formats, for instance. This offers several advantages over the storage, archiving and retrieval of still image information as is currently done for still images over the internet by SHUTTERFLY of Redwood City, Calif., KODAK of Rochester, N.Y., PHOTO WORKS of Seattle, Wash., and several others. Among the advantages offered by this aspect of the invention is reduced total file size without loss of image quality. Specifically, consider that a RedHawk produced high resolution image made at an up-sample ratio of 3× contains nine times as many pixels as a single frame of video from which it is derived. Further consider that this RedHawk high resolution image can often be made from four or fewer frames of video, so if the associated cliplet contains even 8 frames of the video (twice those used to create the still image) the total number of pixels represented in the 8 frame video cliplet is fewer than the number of pixels in the RedHawk high resolution still image. It will be apparent to those skilled in the art that if the cliplet contains compressed video data from the original source file, the high resolution source image produced by RedHawk processing will be precisely the same whether the RedHawk processing is applied to the data before or after transport, storage, retrieval, etc. of the cliplet. This is not the case, however, if the RedHawk high resolution image itself is compressed (by JPEG for instance) and then transported, stored, retrieved, etc. because additional information is lost in the compression of the high resolution JPEG or similar file.

Editing in Both Time and Space

A further additional aspect of the invention is the use of a precision video to still image processing tool like the RedHawk software or Salient Stills' VIDEO FOCUS system to extract varied images from a cliplet. When viewer 10 is used to "capture" cliplets of video and assign a "default" crop-and-process-instruction 34 thereto, a difficulty arises in obtaining a precisely timed image that is similar to that described earlier for still image photography. By using the RedHawk precision still image from video software, or similar to select more precisely the exact instant to capture from within a cliplet, precision timing is achieved while the user continues most of the work-flow advantage obtained when "capturing" images during real-time video play. Advantageously, the RedHawk software is configured so that its crop-and-process parameters are set to those associated with the cliplet when the cliplet is loaded. Further, the RedHawk software may be advantageously configured to store a different crop-and-process-instruction 34 back to the cliplet file representing the user's revised selection of parameters. This may be done either by replacing the default crop-and-process-instruction 34 with the revised parameters or by appending an additional crop-and-process-instruction 34 to the cliplet file.

Processing at One Resolution then Sending and Printing at a Second Resolution

A further aspect of the invention involves the "capture" of a cliplet and generation and/or display of the RedHawk (or similar) high resolution image and optionally editing in time and space (i.e. editing of the crop-and-process-instruction 34) at a first location 36; then transmission of the cliplet file to a second computer 12' at a second location 38 and generating a second RedHawk (or similar) image based on the attached crop-and-process-instruction 34. In the case where a high resolution image is to be produced at second location 38, as for example when ordering a silver halide print, a different up-sample ratio may advantageously used when the RedHawk algorithm is applied at second location 38. This aspect of the invention is particularly advantageous when a user is processing cliplets on a computer 12 and displaying the resulting images on a limited resolution computer screen 40 and then sends the cliplet file to a remote location 38 where a high quality (e.g. silver halide) hard copy image is to be produced on a photographic quality printer 42. Specifically, this arrangement allows 1) fast RedHawk processing with a low up-sample resolution at the first computer 12 since no resolution beyond what can be displayed on a low resolution computer display 40 may be required; 2) low bandwidth and storage requirements for transporting the cliplet to second location 38; and 3) production of a very high resolution image on printer 42 at second location 38 that is faithful to the first lower resolution RedHawk image.

Obtaining Modified Re-Prints Without Re-sending Images

A further aspect of the invention involves capture of a cliplet at a first location 36, optionally editing the crop-and-process-instruction 34 so as to define a first desired image; sending the cliplet with the crop-and-process-instruction 34 to second location 38 where the cliplet is stored; again editing the crop-and-processes-instruction 34 at first location 36 so as to produce a second desired image that differs in timing, cropping or other RedHawk processing parameter; and then transmitting the second crop-and-process-instruction 34 together with a reference to the originally transmitted cliplet to second location 38 to generate a second image at second location 38. This aspect of the invention offers very much reduced transmission time compared with sending the two high resolution images, or sending the cliplet a second time with the second crop-and-process-instruction 34.

Insuring Adequate Storage Availability when Capturing Cliplets

Another aspect of the invention is the generation and storage of a "blank" cliplet storage file of size adequate to store a predetermined number of cliplets. By causing such a cliplet storage file, filled with zeros or with random data, to be written to a computer's reusable storage (e.g. hard disk drive), storage space is "reserved" that is adequate to store the predetermined number of images. When a cliplet is "captured", as described above, the cliplet information is written over information in the existing cliplet storage file. By this means, the user is assured that the predetermined number of cliplets can be captured and stored without encountering a "disk-full" condition. Advantageously, the cliplet storage file is named or otherwise tagged (for instance with user ID, date, time and machine GUID) at the time it is created.

A further advantageous feature is implemented when the user communicates with a central server 44 in connection with generating a cliplet storage file 46 such that a unique identifier may be shared between the server 44 and the cliplet storage file 46 such that when and if the cliplet storage file 46 is sent to a networked server 44, it may be recognized as belonging to a particular user and filed on server 44 accordingly.

Insuring Security of Cliplet during Transmission and Storage

An advantageous aspect of the invention is the use of encryption when storing cliplets and/or crop-and-process-instructions 34 to the cliplet storage file 46. This aspect of the invention is useful as a way to prevent viewing or use of either the final image or the cliplets by unauthorized persons.

A particularly advantageous implementation of this cliplet encryption feature results when a cliplet storage file 46 is generated in connection with a server 44. If the user computer 12 and the server 44 exchange both an ID and encryption key and the encrypted file is then sent to the server 44, the cliplet data is protected and the server 44 can have prior knowledge of how to decrypt the file 46. An especially preferred implementation of this feature causes the user computer 12 to store a "blank" cliplet storage file 46 that is filled with pseudo-random number sequences generated from a key exchanged with the server 44. Cliplet data to be stored into the cliplet file 46 is combined with the pseudo-random sequence and over written into the file 46. This implementation thus combines both storage reservation and encryption, and also simplifies and therefore speeds up the encryption process at the time the cliplet 32 is stored, since the pseudo-random sequence is generated prior to cliplet capture.

Since the user computer 12 and the server 44 exchange the encryption key at the time the cliplet storage file 46 is initialized, there needs to be no exchange of keys at the time the file 46 is uploaded to the server 44. Advantageously, the exchange of keys between the server 44 and the user's computer 12 is done in a secure (i.e. https) network session, and further the encrypted cliplet storage file 46 is transmitted during a separate session, preferably at a later time. This makes it is quite difficult for a would-be eaves dropper to recover both the cliplet storage file 46 and the encryption key.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An apparatus comprising:
a video viewer configured to display a first sequence of video frames; and
a buffer configured to store a video including a temporally adjacent sequence of video frames from the first sequence of video frames;
wherein the video viewer, in response to a command from a user to capture a still image from the first sequence of video frames, is further configured to create a data structure including the video and an editing instruction identifying a particular frame from the temporally adjacent sequence of video frames; and
wherein the command to capture a still image corresponds to a frame being currently displayed by the video viewer when the command is received from the user, and wherein the temporally adjacent sequence of video frames includes a video frame preceding the video frame being currently displayed by the video viewer when the command is received from the user and a video frame following the video frame being currently displayed by the video viewer when the command is received.

2. The apparatus of claim 1, wherein the video comprises at least one tenth of a second of display time.

3. The apparatus of claim 1, wherein the still image is configured to be captured from the particular frame, and wherein the editing instruction describes the particular frame.

4. The apparatus of claim 3, wherein the editing instruction relates to a selected portion of the particular frame.

5. The apparatus of claim 3, wherein the editing instruction comprises a frame number corresponding to the particular frame.

6. The apparatus of claim 3, wherein the editing instruction comprises setting information related to at least one of crop dimensions, a crop location, an up-sample ratio, a sharpness parameter, a persistence parameter, or the number of frames to be processed to form a still image.

7. The apparatus of claim 1, wherein the video viewer and the buffer are included in a computer.

8. The apparatus of claim 7, wherein the video viewer comprises the buffer.

9. The apparatus of claim 1, wherein the first sequence of video frames is configured to be communicated to the video viewer in a compressed data format, and wherein the video viewer is further configured to store the data structure in the buffer in the compressed data format.

10. The apparatus of claim 1, wherein the data structure is a cliplet.

11. The apparatus of claim 10, wherein the video viewer is further configured to transport, store, archive, or retrieve video frames as cliplets.

12. The apparatus of claim 1, wherein the editing instruction comprises a revised instruction indicating a user's revised editing parameter selections, and wherein the revised instruction is configured to replace a default instruction.

13. The apparatus of claim 1, wherein the video viewer is further configured to process the data structure at a first resolution and to transmit the data structure to a second apparatus, and wherein the second apparatus is configured to process the data structure, according to the editing instruction, at a second resolution that is higher than the first resolution.

14. The apparatus of claim 13, wherein the data structure comprises a second editing instruction configured to generate a second still image.

15. The apparatus of claim 1, wherein the video viewer is further configured to generate a blank data structure to reserve data storage space.

16. The apparatus of claim 15, wherein the temporal sequence of video frames and the editing instruction are saved in the blank data structure.

17. The apparatus of claim 16, wherein the blank data structure comprises pseudo-random data that is combined with the temporal sequence of video frames and the editing instruction.

18. The apparatus of claim 17, wherein the apparatus is configured to exchange an encryption key with a server during generation of the blank data structure.

19. The apparatus of claim 17, wherein the apparatus is configured to exchange an encryption key with a server during a secure communication session that is different from a communication session in which an encrypted data structure is communicated from the apparatus to the server.

20. The apparatus of claim 1, wherein the data structure further comprises a unique identifier configured to communicate to a server an association between the data structure and a user or a client computer.

21. The apparatus of claim 1, wherein the buffer is further configured to encrypt the data structure.

22. A method comprising:
displaying a first sequence of video frames using a video viewer;
storing, in a buffer, a video including a temporally adjacent sequence of video frames from the first sequence of video frames;
receiving a command from a user to capture a still image from the first sequence of video frames; and
in response to the command from the user to capture the still image, creating a data structure, using the video viewer, including the video and an editing instruction identifying a particular frame from the temporally adjacent sequence of video frames;
wherein the command to capture a still image corresponds to a frame being currently displayed by the video viewer when the command is received, and wherein the temporally adjacent sequence of video frames includes a prior video frame preceding the video frame being currently displayed by the video viewer when the command is received and a subsequent video frame following the video frame being currently displayed by the video viewer when the command is received.

23. The method of claim 22, wherein the video comprises at least one tenth of a second of display time.

24. The method of claim 22, wherein the still image is configured to be captured from the particular frame, and wherein the editing instruction describes the particular frame.

25. The method of claim 24, wherein the editing instruction relates to a selected portion of the particular frame.

26. The method of claim 24, wherein the editing instruction comprises a frame number corresponding to the particular frame.

27. The method of claim 24, wherein the editing instruction comprises setting information related to at least one of crop dimensions, a crop location, an up-sample ratio, a sharpness parameter, a persistence parameter, or the number of frames to be processed to form a still image.

28. The method of claim 22, wherein the video viewer and the buffer are included in a computer.

29. The method of claim 22, further comprising:
receiving, at the video viewer, the first sequence of video frames in a compressed data format; and
storing the data structure in the buffer in the compressed data format.

30. The method of claim 22, wherein the data structure is a cliplet.

31. The method of claim 30, further comprising transporting, storing, archiving, or retrieving video frames as cliplets using the video viewer.

32. The method of claim 22, wherein the editing instruction comprises a revised instruction indicating a user's revised editing parameter selections, and wherein the revised instruction replaces a default instruction.

33. The method of claim 22, further comprising:
processing the data structure at a first resolution; and
transmitting the data structure to a second apparatus configured to process the data structure, according to the editing instruction, at a second resolution that is higher than the first resolution.

34. The method of claim 33, wherein the data structure comprises a second editing instruction configured to generate a second still image.

35. The method of claim 22, further comprising generating, via the video viewer, a blank data structure to reserve data storage space.

36. The method of claim 35, further comprising saving, via the video viewer, the temporal sequence of video frames and the editing instruction in the blank data structure.

37. The method of claim 36, wherein the blank data structure comprises pseudo-random data that is combined with the temporal sequence of video frames and the editing instruction.

38. The method of claim 37, further comprising exchanging an encryption key with a server during generation of the blank data structure.

39. The method of claim 37, further comprising exchanging an encryption key with a server during a secure communication session that is different from a communication session in which an encrypted data structure is communicated to the server.

40. The method of claim 22, wherein the data structure comprises a unique identifier configured to indicate to a server an association between the data structure and a user or a client computer.

41. The method of claim 22, further comprising encrypting the data structure at the buffer.

42. A method comprising:
defining, using a buffer, a video including a temporally adjacent sequence of video images;
capturing upon receipt of a command from a user, using a video viewer, an image by selecting a video image from the temporally adjacent sequence of video images; and
generating, using the video viewer, a data structure, wherein the data structure includes the video and an editing instruction associated with the captured image that defines processing parameters configured to render a still image corresponding to the captured image;
wherein the temporally adjacent sequence of video images includes a prior video image preceding the selected video image and a subsequent video image following the selected video image.

43. The method of claim 42, wherein the data structure is a cliplet.

44. The method of claim 42, wherein the editing instruction comprises an identification of the captured image and spatial processing information.

45. The method of claim 42, further comprising storing, archiving, processing, or communicating the data structure as a single unit of information in a computer system.

46. A non-transitory computer-readable medium having stored thereon, computer-executable instructions that, if executed by a computing device, cause the computing device to perform a method comprising:
displaying, using a video viewer, a first sequence of video frames;
storing a video including a temporally adjacent sequence of video frames from the first sequence of video frames;
receiving a command from a user to capture a still image from the first sequence of video frames; and
in response to said receiving a command from a user to capture a still image, creating a data structure including the video and an editing instruction identifying a particular frame from the temporally adjacent sequence of video frames;
wherein the command to capture a still image corresponds to a frame being currently displayed by the video viewer when the command is received, and wherein the temporally adjacent sequence of video frames includes a prior video frame preceding the frame being currently displayed by the video viewer when the command is received and a subsequent video frame following the frame being currently displayed by the video viewer when the command is received.

47. The computer-readable medium of claim 46, wherein the data structure is a cliplet.

48. The computer-readable medium of claim 46, wherein the still image is captured from the particular frame, and wherein the editing instruction describes the particular frame.

49. The computer-readable medium of claim 47, wherein the editing instruction relates to a selected portion of the particular frame.

50. The computer-readable medium of claim 47, wherein the editing instruction comprises a frame number corresponding to the particular frame.

51. The computer-readable medium of claim 47, wherein the editing instruction comprises setting information related to at least one of crop dimensions, a crop location, an up-sample ratio, a sharpness parameter, a persistence parameter, and the number of frames to be processed to form a still image.

52. The apparatus of claim 1, wherein the temporally adjacent sequence of video frames comprises a video frame immediately temporally preceding the video frame being currently displayed by the video viewer when the command is received and a video frame immediately temporally following the video frame being currently displayed by the video viewer when the command is received.

53. The method of claim 22, wherein the command to capture a still image corresponds to a frame being currently displayed by the video viewer when the command is received, and wherein the temporal temporally adjacent sequence of video frames comprises a prior video frame immediately temporally preceding the video frame being currently displayed by the video viewer when the command is received and a subsequent video frame immediately temporally following the video frame being currently displayed by the video viewer when the command is received.

* * * * *